Patented Nov. 28, 1933

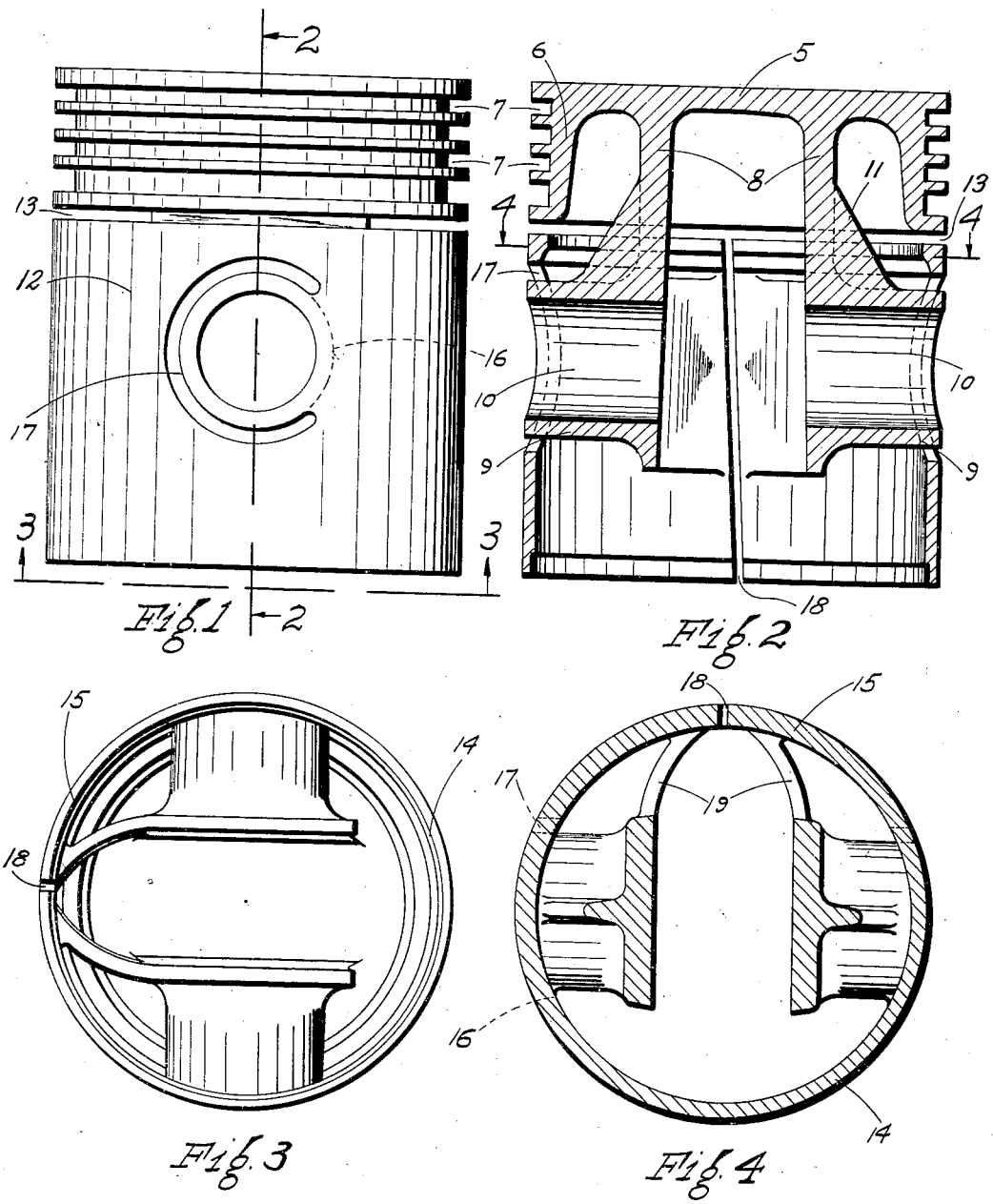

1,936,601

UNITED STATES PATENT OFFICE 1,936,601

PISTON

Frank Jardine, Cleveland, Ohio, assignor, by mesne assignments, to The Cleveland Trust Company, Cleveland, Ohio, a corporation of Ohio, as Trustee Application June 5, 1930. Serial No. 459,317

2 Claims. (Cl. 309—11)

This invention relates to pistons, and particularly to internal combustion engine pistons composed of aluminum alloy or other material having a higher co-efficient of expansion than the cylinders in which they are to be operated.

Internal combustion engine pistons of aluminum alloy or similar high expansion materials have been provided to a large extent with split skirts to permit circumferential expansion thereof at high temperatures so that a close clearance may be maintained between the skirt and the cylinder wall throughout the range of operating temperatures. It has been found, however, in some instances, that the rapidly fluctuating pressures to which the thrust faces of the pistons are subjected and the consequent repeated flexing of the portions of the skirts immediately adjacent the splits have given rise to fatigue of the metal of these portions, resulting in a permanent set thereof inwardly of the original circular outline of the skirt. Such changes in shape permit piston slapping and oil pumping and in time, largely defeat the purpose of the split skirt. Accordingly, the primary object of this invention is to provide a split skirt piston which will be relatively rigid under the lateral thrust arising from the angularity of the connecting rod, but which will be free for movement to compensate for the expansion thereof under increased temperature.

Another object is to provide a piston having a thrust face designed to take the thrust of the power stroke in an internal combustion engine which is continuous throughout its extent and which is integral with the piston pin bosses in the line of application of the lateral thrust.

A further object is to provide a piston skirt with a split in the thrust face which takes the thrust of the compression stroke, the split being arranged to compensate for the expansion of the entire skirt.

Another object is to provide a piston having a split in a bearing face and struts for transmitting thrust from the piston pin bosses to the bearing face which are relatively rigid in the direction of the thrust and relatively flexible tangentially of the skirt.

Another object is to provide struts for connecting a bearing face of a skirt to the piston pin bosses in which flexing is distributed throughout the length thereof and localized bending is avoided.

Other objects relating to details of construction and economies of manufacture will appear hereinafter.

In the accompanying drawing, which illustrates a preferred embodiment of the invention:

Fig. 1 is a side elevation of the improved piston.

Fig. 2 is a vertical section of the same taken on a plane indicated by the line 2—2 on Fig. 1.

Fig. 3 is a bottom plan view of the piston, taken in the direction of the arrows 3—3 of Fig. 1.

Fig. 4 is a horizontal section taken on the line 4—4 of Fig. 2.

Referring to the drawing, which illustrates a piston for an internal combustion engine, the head of the piston consists of a disc 5 having a depending annular flange 6 provided with grooves 7 arranged in any desired manner to receive the usual piston rings.

Depending piers 8 are formed integrally with the disc 5 and are spaced from the flange 6. The lower ends of the piers 8 carry bosses 9 formed with bores 10 to receive the wrist pin which articulates the piston to the engine connecting rod. Triangular webs 11 extend between the piers 8 and the bosses 9 to brace the latter.

A skirt 12 is carried by the bosses 9 and is spaced from the flange 6 of the head by an annular gap 13. The skirt 12 constitutes a substantially complete cylinder and includes a maximum thrust face 14 which is adapted to take the lateral thrust of the power stroke, and a minimum thrust face 15 which is adapted to take the thrust of the compression stroke. The maximum thrust face 14 is integral with the bosses 9 as shown at 16 through substantially 90 degrees of arc, the remainder of the skirt being separated from the bosses by arcuate slots 17 extending substantially 270 degrees about the bosses. The integral connections 16 constitute the sole support of the skirt on the maximum thrust side, and accordingly are of sufficient extent to prevent tilting movement of the skirt with respect to the head of the piston.

The minimum thrust face 15 is provided with a substantially vertical split 18 extending from the lower edge thereof to the annular gap 13. Struts 19 are formed integrally with the piers 8 and bosses 9 and converge to points of connection with the skirt 12 on opposite sides of the split 18. The struts are curved throughout their length, the curvature varying from a minimum at the points of connection with the piers 8 to a maximum at the points of connection with the skirt 12. Accordingly, flexing of the struts 19 is distributed uniformly along their length.

It will be evident that the struts 19 constitute the sole support of the skirt on the minimum thrust side. Accordingly, the lateral thrust of the compression stroke is transmitted to the cylinder wall directly through the struts and the portions of the skirt to which the same are connected. Due to the curvature of the cylinder wall, the application of a lateral force to the struts tends to slide the portions of the skirt 12 adjacent the split 18 toward each other and close the split. This force is relatively large when the struts lie in a straight line at right angles to the piston pin, and decreases as the points of connection of the struts with the skirt approach the split. Since it is desired that the skirt be as nearly rigid as possible under lateral thrust, the struts are preferably connected to the skirt as closely as possible to the edges of the split 18.

In use, the piston is installed in an internal combustion engine cylinder with a relatively small clearance and with the solid thrust face 14 arranged to receive the thrust of the power stroke. As the engine is operated, the piston becomes heated by the high temperatures existing in the combustion chamber above the head 5. The heat absorbed by the piston is transferred to the cylinder walls, which are cooled in the usual manner, by the sealing rings mounted in the grooves 7 and by the skirt. Due to the relatively high co-efficient of expansion of the material of which the piston is made, the skirt expands circumferentially and tends to approach the dimensions of the cylinder. This circumferential expansion is absorbed by the split 18, the edges thereof approaching each other to compensate for the increased peripheral length of the skirt. The struts 19 are bowed to accord with the movement of the skirt, the bending being distributed throughout the length of the struts due to the initial curvature thereof. The expansion of the struts resulting from the heat conducted thereto through the piers 8 produces a slight increase in length which facilitates the closing of the split and reduces the resistance offered by the struts to the circumferential movement of the portions of the skirt adjacent the split.

The diametrical expansion of the head has but a slight effect upon the spacing of the bosses 9 by reason of the connection of the piers 8 to the head 5 at points spaced inwardly from the flange 6. As a result, the maximum thrust face 14 is maintained at all times with the curvature and dimensions best suited for effective cooperation with the cylinder wall, and harmful stresses are avoided.

While the foregoing description is necessarily of a detailed character in order that the invention may be fully set forth, it is to be understood that the specific terminology employed is not to be construed as restrictive or limiting, and it is to be further understood that various re-arrangements of parts and modifications of structural detail may be resorted to without departing from the spirit or scope of the invention as defined in the following claims.

I claim:

1. A piston comprising a head having a depending cylindrical ring flange, a pair of depending piers integral with the head and spaced inwardly from said ring flange, aligned wrist pin bosses each having its inner end integral with one of said piers, a substantially cylindrical skirt having its upper edge separated from the lower edge of said ring flange carried by said wrist pin bosses and having a substantially vertical slot on one side disposed about midway between said bosses, the outer ends of said bosses being substantially flush with said skirt and being partially separated therefrom by arcuate slots extending about the bosses more than 180° with at least 180° disposed on the side adjacent the thrust face having the substantially vertical slot therein, and an integral connection between each boss and the skirt on the side of the boss remote from said vertical slot confined within a narrow vertical zone spaced from the vertical plane through the wrist pin axis.

2. A piston comprising a head having a depending cylindrical ring flange, a pair of depending piers integral with the head and spaced inwardly from said ring flange, aligned wrist pin bosses each having its inner end integral with one of said piers, a substantially cylindrical skirt having its upper edge separated from the lower edge of said ring flange carried by said wrist pin bosses and having a substantially vertical slot on one side disposed about midway between said bosses, struts extending horizontally from the inner ends of said bosses to said skirt at points adjacent to and on opposite sides of said vertical slot, the outer ends of said bosses being substantially flush with said skirt and being partially separated therefrom by arcuate slots extending about the bosses more than 180° with at least 180° disposed on the side adjacent the thrust face having the substantially vertical slot therein, and an integral connection between each boss and the skirt on the side of the boss remote from said vertical slot confined within a narrow vertical zone spaced from the vertical plane through the wrist pin axis.

FRANK JARDINE.